United States Patent
Yamamoto et al.

(10) Patent No.: US 11,400,896 B2
(45) Date of Patent: Aug. 2, 2022

(54) VEHICLE

(71) Applicant: KAWASAKI JUKOGYO KABUSHIKI KAISHA, Hyogo (JP)

(72) Inventors: Teruaki Yamamoto, Himeji (JP); Sota Tsurumi, Osaka (JP)

(73) Assignee: KAWASAKI MOTORS, LTD., Hyogo (JP)

(*) Notice: Subject to any disclaimer, the term of this patent is extended or adjusted under 35 U.S.C. 154(b) by 0 days.

(21) Appl. No.: 17/082,517

(22) Filed: Oct. 28, 2020

(65) Prior Publication Data
US 2022/0126797 A1    Apr. 28, 2022

(51) Int. Cl.
    *B60T 7/06*    (2006.01)
    *B62D 21/18*    (2006.01)
    (Continued)

(52) U.S. Cl.
CPC ............... *B60T 7/06* (2013.01); *B60T 7/047* (2013.01); *B60T 7/10* (2013.01); *B62D 21/183* (2013.01); *B60R 21/13* (2013.01); *B60Y 2200/86* (2013.01)

(58) Field of Classification Search
CPC .. B60T 7/047; B60T 7/045; B60T 7/101–105; B60T 7/10; B60T 7/06; B62D 21/183; B60R 21/13; B60Y 2200/86; Y10T 74/20426; Y10T 74/20468; Y10T 74/2022; Y10T 74/2069; Y10T 74/20702
See application file for complete search history.

(56) References Cited

U.S. PATENT DOCUMENTS

| | | | | |
|---|---|---|---|---|
| 2,303,586 A | * | 12/1942 | Snell | G05G 7/02 74/503 |
| 2,656,025 A | * | 10/1953 | Martin | B60T 7/101 192/219.6 |

(Continued)

FOREIGN PATENT DOCUMENTS

| | | | | |
|---|---|---|---|---|
| DE | 1630880 A1 | * | 1/1972 | ............. B60T 7/101 |
| EP | 1431148 A2 | * | 6/2004 | ............... B60T 7/10 |

(Continued)

OTHER PUBLICATIONS

EPO Translation of the Description of EP 1431148 A2, Larsen, Jun. 23, 2004. (Year: 2021).*

(Continued)

*Primary Examiner* — Daniel D Yabut
(74) *Attorney, Agent, or Firm* — Wenderoth, Lind & Ponack, L.L.P.

(57) ABSTRACT

Provided is a vehicle including: a brake pedal configured to be able to operate a foot brake device; an accelerator pedal located on a right side of the brake pedal; a shift lever; a steering wheel; and a handbrake device which includes a brake lever extending in a front-rear direction and a grip provided at a rear end of the brake lever, and is configured to be able to manually operate and release a parking brake by a parking brake device. The handbrake device supports the brake lever so that the grip is movable between a first position at which the parking brake is released and a second position at which the parking brake is operated. The second position is set to a position at which the grip is recognized upon a start operation with any one of the accelerator pedal, the shift lever, and the steering wheel.

17 Claims, 8 Drawing Sheets

(51) Int. Cl.
  *B60T 7/10*    (2006.01)
  *B60T 7/04*    (2006.01)
  *B60R 21/13*   (2006.01)

(56) References Cited

U.S. PATENT DOCUMENTS

| | | | | |
|---|---|---|---|---|
| 3,672,240 | A | * | 6/1972 | Grosseau ................ B60T 7/101 |
| | | | | 74/503 |
| 3,850,048 | A | * | 11/1974 | Moore ...................... B60T 7/08 |
| | | | | 74/491 |
| 5,251,713 | A | | 10/1993 | Enokimoto |
| 6,886,677 | B2 | | 5/2005 | Rupiper et al. |
| 2011/0154941 | A1 | * | 6/2011 | Gibbs ...................... B60T 7/08 |
| | | | | 74/503 |

FOREIGN PATENT DOCUMENTS

| | | | | | |
|---|---|---|---|---|---|
| FR | 2742399 | A1 | * | 6/1997 | .............. B60T 7/101 |
| FR | 2748438 | A1 | * | 11/1997 | .............. B60T 7/101 |
| FR | 2752802 | A1 | * | 3/1998 | .............. B60T 7/101 |
| FR | 2753947 | A1 | * | 4/1998 | .............. B60T 7/105 |

OTHER PUBLICATIONS

EPO Translation of the Description of FR 2753947 A1, Froumajou, Apr. 3, 1998. (Year: 2021).*

EPO Translation of the Description of FR 2752802 A2, Gilleron, Mar. 6, 1998. (Year: 2021).*

* cited by examiner

VEHICLE

BACKGROUND OF THE INVENTION

Field of the Invention

The present invention relates to a vehicle.

Description of the Related Art

Generally, vehicles such as four-wheeled vehicles are equipped with a parking brake device. The parking brake device applies a parking brake to the wheels when the vehicle is stopped to prevent the vehicle from moving. The parking brake device is operated by a brake operating device provided in a driver seat. As the brake operating device, various types such as a hand brake device that can be manually operated (for example, U.S. Pat. No. 5,251,713) and a pedal device that can be operated by depressing (for example, U.S. Pat. No. 6,886,677) are adopted.

The brake operating device includes a braking operator operated by a driver, and the braking operator is movable between a brake releasing position for releasing the parking brake and a brake operating position for operating the parking brake.

SUMMARY OF THE INVENTION

By moving the braking operator to the brake operating position, the parking brake can be applied and the vehicle can be kept in a stopped state. When the vehicle is driven, it is necessary to return the braking operator from the brake operating position to the brake releasing position and release the parking brake. However, there are cases where the braking operator is forgotten to be returned to the brake releasing position, that is, the vehicle is driven without the parking brake being released.

An object of the present invention is to provide a vehicle capable of suppressing forgetting to return the braking operator that operates the parking brake device to the brake releasing position.

According to one embodiment of the present invention, there is provided a vehicle including: a brake pedal configured to be able to operate a foot brake device; an accelerator pedal located on a right side of the brake pedal; a shift lever; a steering wheel; and a handbrake device which includes a brake lever extending in a front-rear direction and a grip provided at a rear end of the brake lever, and is configured to be able to manually operate and release a parking brake by a parking brake device. The handbrake device supports the brake lever so that the grip is movable between a first position (brake releasing position) at which the parking brake is released and a second position (brake operating position) at which the parking brake is operated. The second position is set to a position at which the grip is recognized upon a start operation for moving the vehicle with any one of the accelerator pedal, the shift lever, and the steering wheel.

According to the present invention, when the start operation is performed in a state where the parking brake is operated (that is, the grip is located in the second position), the grip of the brake lever is recognized, so that it is easier to notice that the parking brake is in the operating state. As a result, forgetting to return the grip to the first position is suppressed in the running state.

Further, the second position may be located behind the first position, and when the grip is located in the second position, in a vehicle width direction, a left end of the grip may be located on a left side of a right end of the accelerator pedal.

According to this configuration, when the right foot depressing the brake pedal is switched to the accelerator pedal in a state where the grip is located in the second position, the grip of the brake lever easily interferes with the right foot. This makes it easier to recognize that the parking brake is in the operation state.

Further, when the grip is located in the second position, in the vehicle width direction, the left end of the grip may be located on a right side of a right end of the brake pedal.

According to this configuration, the above-mentioned recognition that the parking brake is in the operating state when the right foot depressing the brake pedal is switched to depress the accelerator pedal can be realized without affecting the operation of the parking brake.

Further, when the grip is located in the second position, a front end of the grip is located behind a front end of the steering wheel, and a rear end of the grip may be located in front of a rear end of the steering wheel.

Generally, in the side view of the vehicle, the knee portion of the driver is located in the range in which the steering wheel is projected downward due to the relationship between the driver seat and the steering wheel. Therefore, as in this configuration, by arranging the grip within the range in which the steering wheel is projected downward in the side view of the vehicle, in the second position, when the driver switches the right foot depressing the brake pedal to depress the accelerator pedal to perform the start operation, the grip easily interferes with the right knee of the driver.

Further, the vehicle may further include a driver seat, the driver seat may include a seat cushion extending in the front-rear direction, and when the grip is located in the second position, the grip may be located above the seat cushion and below the steering wheel.

According to this configuration, the grip is located between the seat cushion and the steering wheel in the up-down direction in the second position, so that the grip is easily located at the height of the knee of the right foot of the driver located between the seat cushion and the steering wheel. Therefore, when the driver switches from depressing the brake pedal to depressing the accelerator pedal to perform the start operation, the grip easily interferes with the knee of the right foot of the driver.

Further, the handbrake device may include: a base plate fixed to a body frame; a first link that extends in an up-down direction and has an upper end turnably supported by the base plate; and a second link that extends in the up-down direction on a front side of the first link and has an upper end turnably supported by the base plate. A brake wire connected to the parking brake may be connected to either the first link or the second link. The brake lever may be turnably coupled to a lower end of each of the first link and the second link at a front end. When the grip moves from the first position to the second position, the grip may move linearly in the front-rear direction along an extending direction of the brake lever.

According to this configuration, since the brake wire is connected to the first link or the second link, the area of the surface where the brake wire slides against a tubular component can be reduced as compared to the structure in which a brake wire is placed inside the tubular component which is a general structure in a handbrake device that moves a grip linearly. Therefore, while the handbrake device is configured to move the grip linearly, it is easier to suppress wear due to sliding of the brake wire.

Further, in the vehicle width direction, the grip in the second position is located on a left side of the grip in the first position.

According to this configuration, when the grip is moved from the first position to the second position, the grip is pulled out to the left side so as to approach the driver toward the rear. As a result, when the grip is located in the first position, the grip is away from various control operators, and hence is easily accessible. On the other hand, when the grip is located in the second position, it is easier to recognize that the grip is located in the second position by operating the various control operators.

Further, the vehicle may further include a dashboard, the dashboard may have a recess that is recessed forward, and when the grip is located in the first position, at least a part of the grip may be located in the recess.

According to this configuration, when the grip is located in the first position, that is, when the parking brake is released, the grip does not get in the way and the vehicle interior space can be widely secured.

Further, when the grip is located in the second position, the grip may be located above and behind the position when the grip is located in the first position.

According to this configuration, when the grip is located in the second position, it is easier to position the grip close to the knee position of the driver, and the driver easily recognizes that the grip is located in the second position at the time of the start operation.

Further, when the grip is located in the first position, a rear end of the grip may be located in front of a rear end of the shift lever, and when the grip is located in the second position, the rear end of the grip may be located behind the rear end of the shift lever.

According to this configuration, when the grip is located in the second position, it is easier to position the grip close to the knee position of the driver, and the driver easily recognizes that the grip is located in the second position at the time of the start operation.

Further, in a plan view, at least a part of the grip located in the second position may be located in a region obtained by projecting the accelerator pedal in the front-back direction.

According to this configuration, when the right foot depressing the brake pedal is switched to depress the accelerator pedal on the right side of the brake pedal in a state where the grip is located in the second position, the grip easily interferes with the right foot. This makes it easier to recognize that the parking brake is in the operation state.

Further, the steering wheel may be arranged on one side in a vehicle width direction, and the handbrake device may be arranged on the other side in the vehicle width direction with respect to the steering wheel.

According to this configuration, even when the grip is located in the second position, the grip does not get in the way when the driver gets into the driver seat, and deterioration of the boarding property to the vehicle is prevented.

Further, according another aspect of the present invention, there is provided a vehicle including: a foot brake pedal configured to be able to operate braking by a foot brake; an accelerator pedal located on a right side of the brake pedal; a shift lever; a steering wheel; and a handbrake device which includes a brake lever extending in a front-rear direction and a grip provided at a rear end of the brake lever, and is configured to be able to manually operate and release a parking brake by a parking brake device. The handbrake device supports the brake lever so that the grip is movable between a first position at which the parking brake is released and a second position at which the parking brake is operated. The second position is set to a position at which the grip interferes with any one of the accelerator pedal, the shift lever, and the steering wheel which are subjected to start operation.

According to this configuration, since the grip located in the second position interferes with any one of the accelerator pedal, the shift lever, and the steering wheel which are subjected to start operation, so that it is easier to notice that the parking brake is in the operation state.

Further, according to further another aspect of the present invention, there is provided a vehicle including: a driver seat; a start operator located in front of the driver seat; and a handbrake device which includes a brake lever extending in a front-rear direction and a grip provided at a rear end of the brake lever and located in front of the driver seat, and is configured to be able to manually operate and release a parking brake by a parking brake device. The handbrake device supports the brake lever so that the grip is movable between a first position at which the parking brake is released and a second position at which the parking brake is operated. When the grip is located in the second position, the grip is arranged so as to narrow, to a rear side, a grip rear region defined on a rear side of the grip in a start operation region obtained by projecting a region, which is obtained by projecting the start operator in the front-rear direction, to an upper side of a vehicle body as compared to a position when the grip is located in the first position.

According to the present invention, since, when the grip is located in the second position, the start operation region is narrowed, when the driver operates the start operator, the driver easily recognizes that the grip is located in the second position.

Further, the vehicle may further include a braking operator located in front of the driver seat and adjacent to the start operator in a vehicle width direction, and regardless of whether the grip is located in the first position or the second position, the grip may be arranged at a position away from a braking operation region obtained by projecting a region, which is obtained by projecting the braking operator in the front-rear direction, to an upper side of the vehicle body.

According to this configuration, the operation of the braking operator is not hindered by the grip regardless of whether the grip is located in the first position or the second position.

BRIEF DESCRIPTION OF THE DRAWINGS

The foregoing and the other features of the present invention will become apparent from the following description and drawings of an illustrative embodiment of the invention in which.

DETAILED DESCRIPTION OF THE INVENTION

A vehicle 1 according to an embodiment of the present invention will be described with reference to FIGS. 1 to 8. The vehicle 1 according to the present embodiment is a utility vehicle. In the following description, the traveling direction of the vehicle 1 is referred to as the "front" of the vehicle 1 and each part, and the left-right direction seen from an occupant is referred to as the "left-right direction" of the vehicle 1 and each part.

Figure 1:
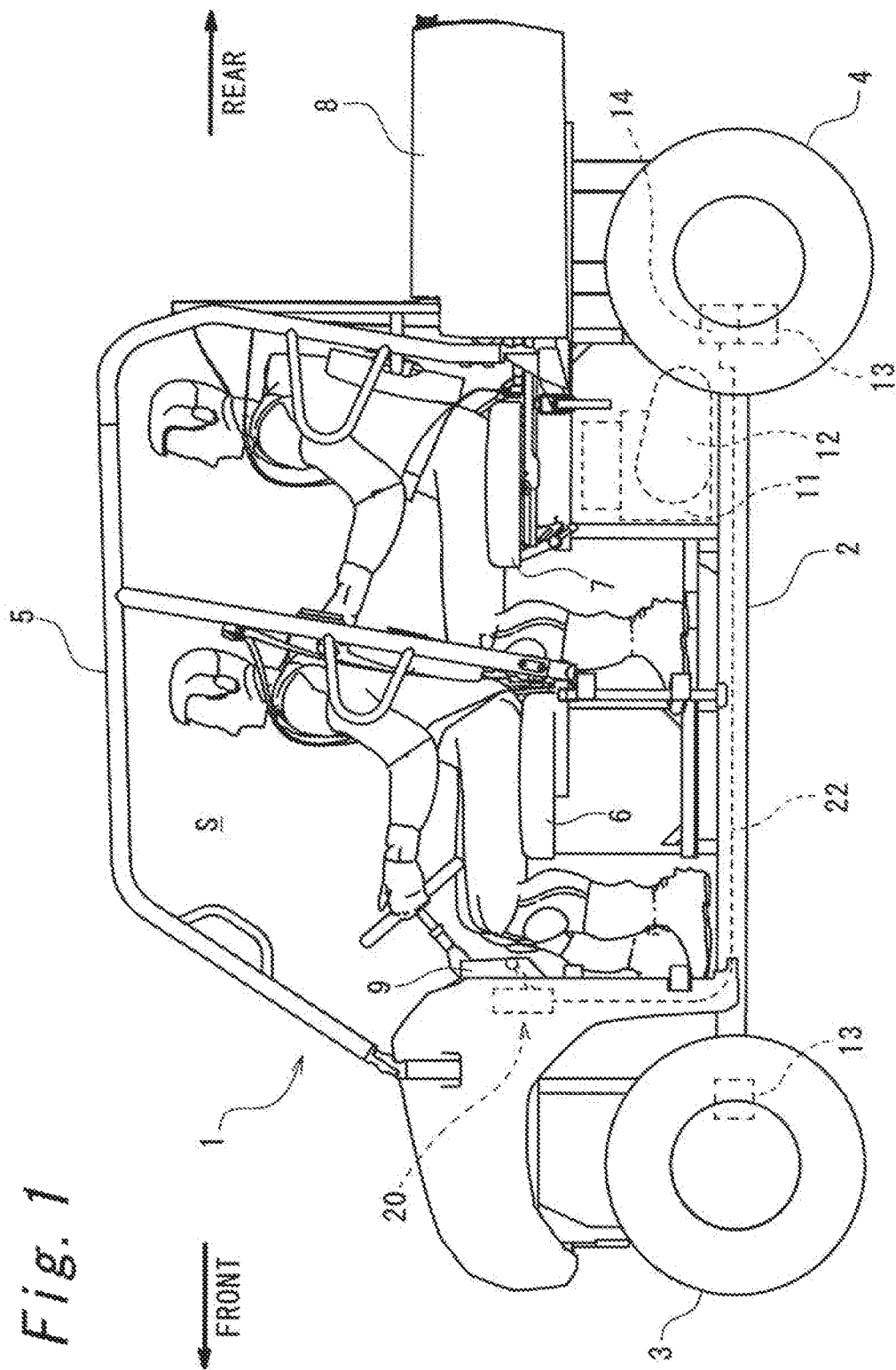
FIG. 1 is a side view of a vehicle according to an embodiment of the present invention.

FIG. 1 is a left side view of the vehicle 1. As shown in FIG. 1, the vehicle 1 includes a vehicle body frame 2 that constitutes the skeleton of the vehicle body. A pair of left and right front wheels 3 is arranged on both front sides of the body frame 2, and a pair of left and right rear wheels 4 is arranged on both rear sides of the body frame 2. A riding space S is located between the front wheels 3 and the rear wheels 4. The riding space S is surrounded by a ROPS (rollover protective structure) 5.

A front seat 6 is arranged in the front half of the riding space S. A rear seat 7 is arranged in the rear half of the riding space S. A cargo bed 8 is provided behind the rear seat 7. Further, at the front end of the riding space S, a dashboard 9 extending in the up-down direction and the left-right direction is arranged. The dashboard 9 defines the front end of the riding space S.

Below the rear seat 7 and/or the cargo bed 8, an engine 11 and a transmission 12 are arranged. The vehicle 1 is configured so that the rotational torque output from the engine 11 is changed by the transmission 12 and transmitted to the rear wheels 4.

Further, the vehicle 1 includes foot brake devices 13 and parking brake devices 14 which are brake systems different from the foot brake devices 13, as brake devices. Each of the foot brake devices 13 is provided on each of the front wheels 3 and the rear wheels 4. When the vehicle 1 is running and stopped, a hydraulic pressure generated by depression operation of a brake pedal 35 (see FIGS. 3 and 4) is transmitted to the foot brake devices 13 through a hydraulic system (not shown) to apply a foot brake to the front wheels 3 and the rear wheels 4 with the hydraulic pressure as an operating pressure.

Meanwhile, each of the parking brake devices 14 is provided only on the rear wheels 4. When the vehicle is parked, manual operation of a handbrake device 20 is transmitted to the parking brake devices 14 via brake wires 22 to apply a parking brake to the rear wheels 4.

Figure 2:
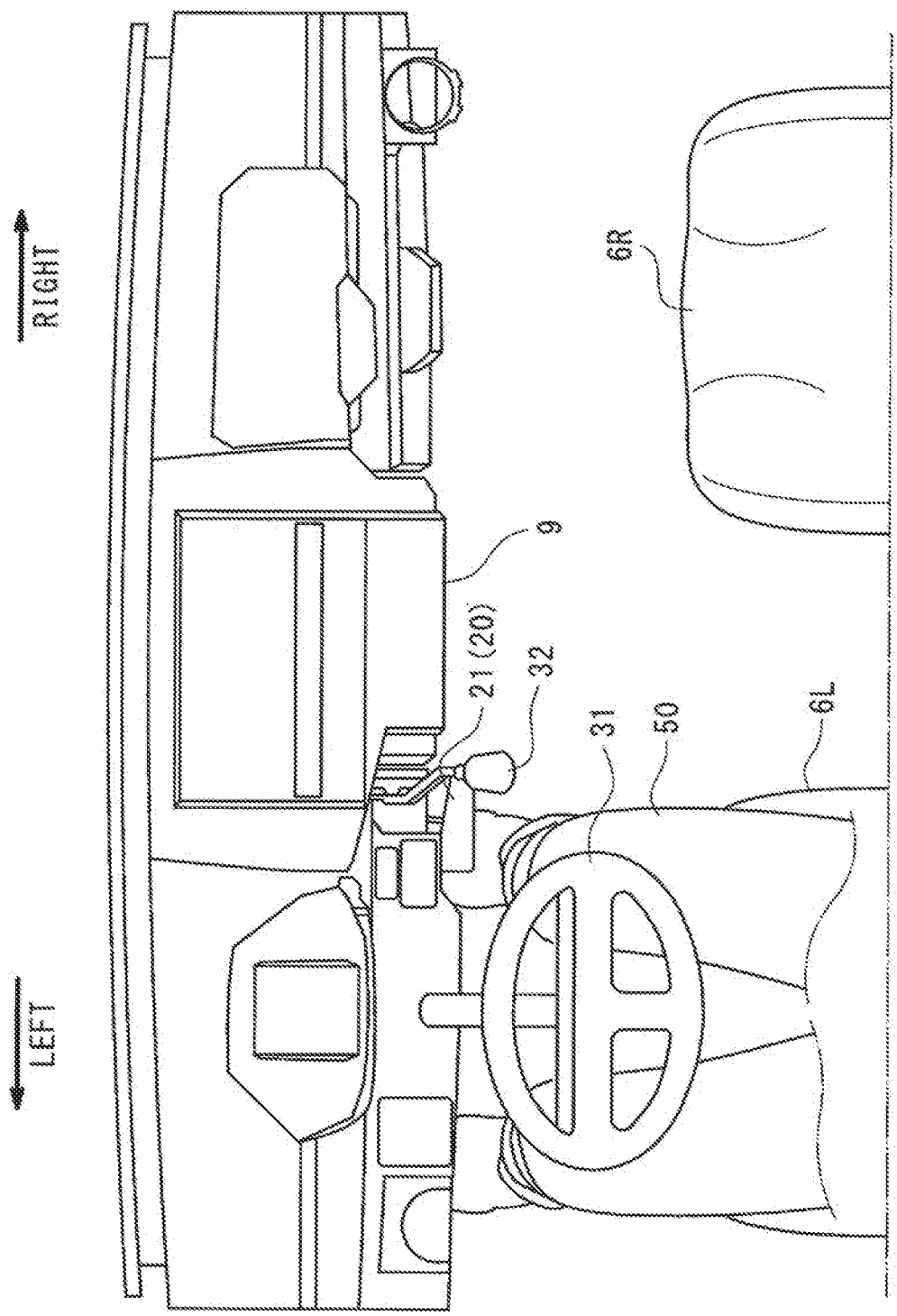
FIG. 2 is a plan view showing the periphery of a front seat of the vehicle.

FIG. 2 is a plan view showing the periphery of the front seat 6 in the riding space S, and a leg portion 50 of a driver is also shown. As shown in FIG. 2, the front seat 6 includes a driver seat 6L arranged on the left side of the riding space S and a passenger seat 6R arranged on the right side of the riding space S. That is, the vehicle 1 is a left-hand drive vehicle. On the dashboard 9, a steering wheel 31, a shift lever 32, and a brake lever 21 of the handbrake device 20 are arranged in front of the driver seat 6L.

Figure 3:
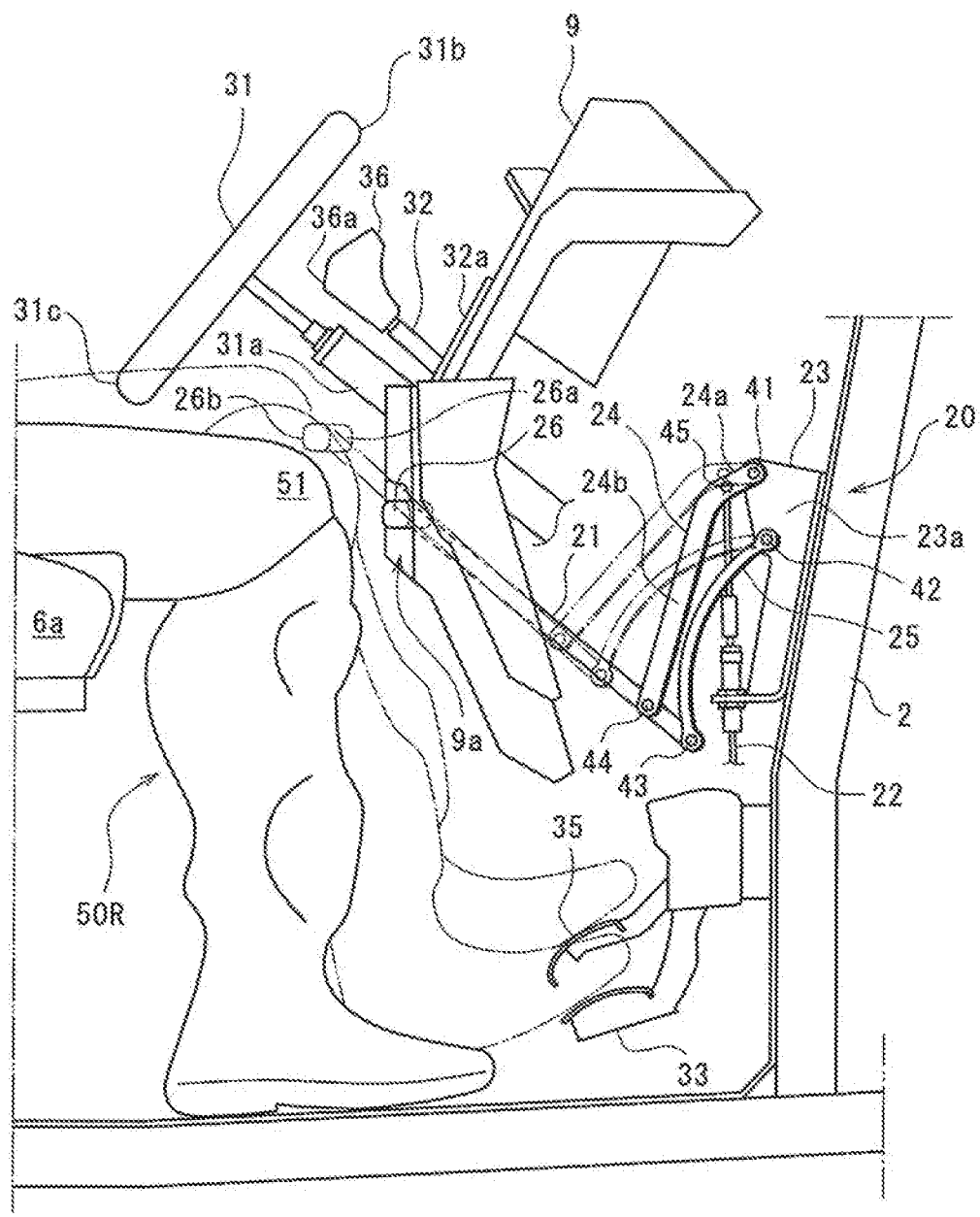
FIG. 3 is an enlarged side view showing the periphery of the foot space of the driver seat.
Figure 4:
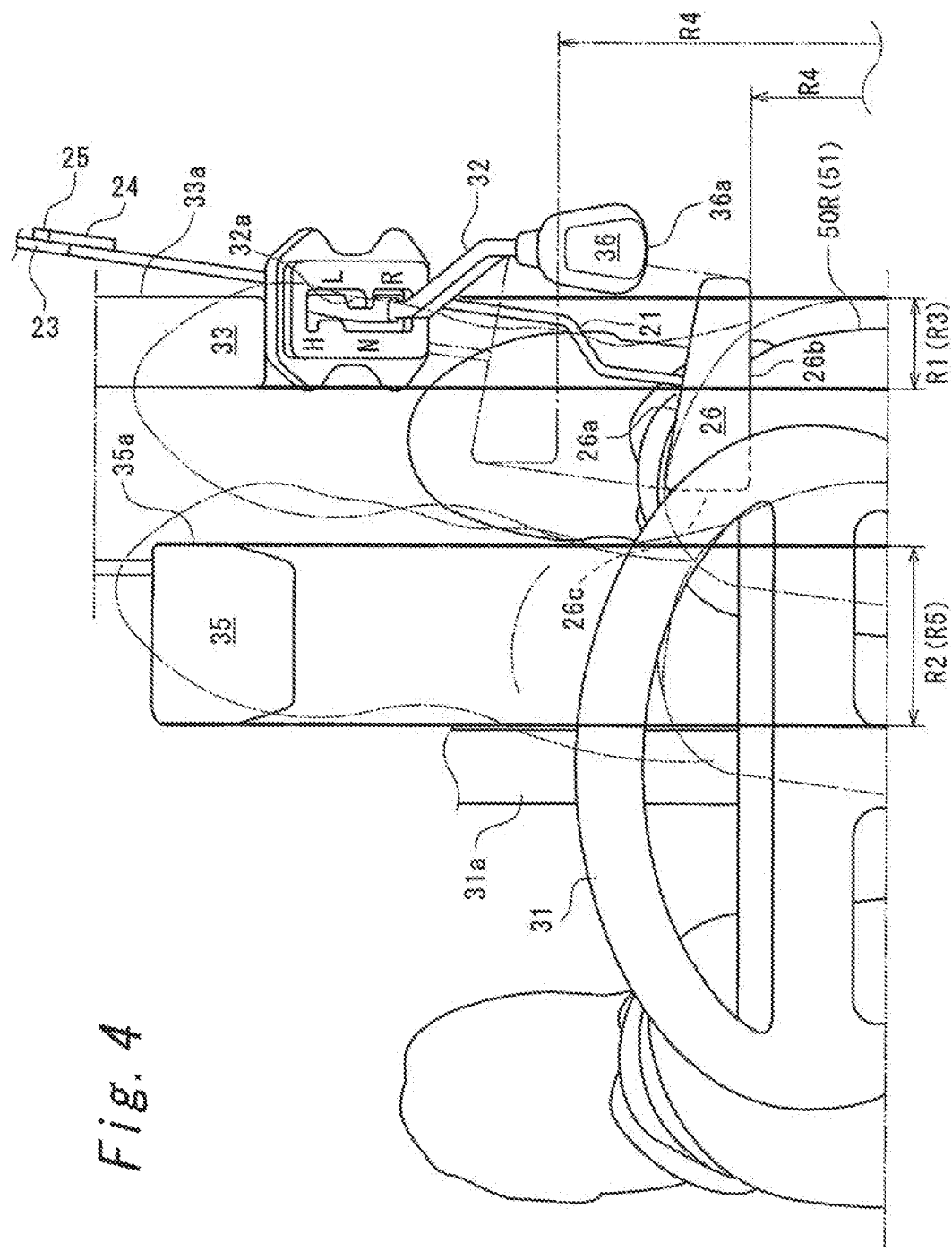
FIG. 4 is an enlarged plan view showing the periphery of the foot space of the driver seat.

FIG. 3 is a right side view of the periphery of the foot space of the driver seat 6L, and FIG. 4 is a plan view of the periphery of the foot space of the driver seat 6L, and the leg portion 50 of the driver is also shown in each figure. As shown in FIGS. 3 and 4, an accelerator pedal 33 is arranged at the right end of the foot space of the driver seat 6L. On the left side of the accelerator pedal 33, the brake pedal 35 is arranged so as to be adjacent to each other. The accelerator pedal 33 and the brake pedal 35 are located in the front part of the right half of the driver seat 6L, and are operated by being depressed by a right foot 50R of the driver.

The shift lever 32 and the accelerator pedal 33 are operated by the driver at the time of the start operation for starting (moving) the vehicle 1. The accelerator pedal 33 constitutes a start operator according to the present invention. The steering wheel 31 and the shift lever 32 may also be operated by the driver at the time of the start operation. The brake pedal 35 is operated by the driver when braking is applied when the vehicle 1 is not in a parked state, that is, in a running state or a stopped state, and constitutes a braking operator according to the present invention.

The steering wheel 31 is turnably configured around a steering shaft 31a extending in a direction inclined upward toward the rear. By turning the steering wheel 31, the front wheels 3 (see FIG. 1) are steered to the left and right.

The shift lever 32 extends in a direction inclined upward toward the rear on the front right side of the steering wheel 31. Specifically, in the right side view shown in FIG. 3, the shift lever 32 extends substantially parallel to the steering shaft 31a above the steering shaft 31a. Further, in the plan view shown in FIG. 4, the shift lever 32 is offset to the right so as to be away from the steering shaft 31a toward the rear.

The shift lever 32 is configured to be movable to shift positions arranged vertically. Depending on the shift position of the shift lever 32, the transmission 12 (see FIG. 1) is shifted to the corresponding shift stage. In the present embodiment, the transmission 12 is an automatic transmission, and as shown in FIG. 4, the shift lever 32 is configured to be movable to a high-speed forward stage H, a low-speed forward stage L, a neutral position N, and a rearward speed stage R, which are set in a shift gate 32a from above in the stated order. A grip 36 gripped by the driver is provided at the rear end of the shift lever 32.

The accelerator pedal 33 is configured so that it can be operated by being depressed downward. The rotational torque output from the engine 11 (see FIG. 1) is controlled according to the amount of depression of the accelerator pedal 33. As shown in FIG. 4, the accelerator pedal 33 is located on the front right side of the steering wheel 31, and the position in the vehicle width direction overlaps with the shift lever 32.

The brake pedal 35 is configured so that it can be operated by being depressed downward. The braking strength of the foot brake devices 13 (see FIG. 1) is controlled according to the amount of depression of the brake pedal 35. As shown in FIG. 4, the brake pedal 35 is located closer to the right side in front of the steering wheel 31, and is located on the left side of the shift lever 32 in the vehicle width direction.

With reference also to FIG. 3, the handbrake device 20 is located on the front right side of the steering wheel 31 and below the shift lever 32. The handbrake device 20 includes a brake lever 21 extending in a direction inclined upward toward the rear, a base plate 23 fixed to the vehicle body frame 2, and a first link 24 and a second link 25 coupling the base plate 23 and the brake lever 21.

The brake lever 21 extends in a direction inclined upward toward the rear on the front right side of the steering wheel 31, and the position in the vehicle width direction overlaps with the shift lever 32. Specifically, in the right side view shown in FIG. 3, the brake lever 21 extends substantially parallel to the steering shaft 31a below the steering shaft 31a. Further, in the plan view shown in FIG. 4, the brake lever 21 extends in a direction inclined to the left toward the rear, and is offset to the left so as to be close to the steering shaft 31a.

A grip 26 gripped by the driver is provided at the rear end of the brake lever 21. In the plan view shown in FIG. 4, a front end 26a of the grip 26 extends in a direction inclined to the rear toward the right so as to be orthogonal to the extending direction of the brake lever 21, and a rear end 26b of the grip 26 extends parallel to the vehicle width direction.

In the plan view shown in FIG. 4, the base plate 23 extends in a direction inclined to the left toward the rear in parallel to the brake lever 21. In the side view shown in FIG. 3, the base plate 23 extends in the up-down direction. The upper end of the first link 24 is turnably supported on the upper end rear portion of the base plate 23 via the first support pin 41. The first link 24 includes a first link upper portion 24a extending downward from the upper end portion in a direction inclined to the rear, and a first link lower portion 24b bending from the rear end of the first link upper portion 24a and extending downward. The first link 24 is turnable in the front-rear direction along a right side surface 23a of the base plate 23.

Further, the upper end of the second link 25 is turnably supported via the second support pin 42 slightly above the intermediate position in the up-down direction of the rear end of the base plate 23. The second link 25 is located on the front side of the first link 24, and is curved so as to be convex from the upper end toward the first link 24 and extends downward. The second link 25 is turnable in the front-rear direction along the right side surface 23a of the base plate 23.

Figure 5:
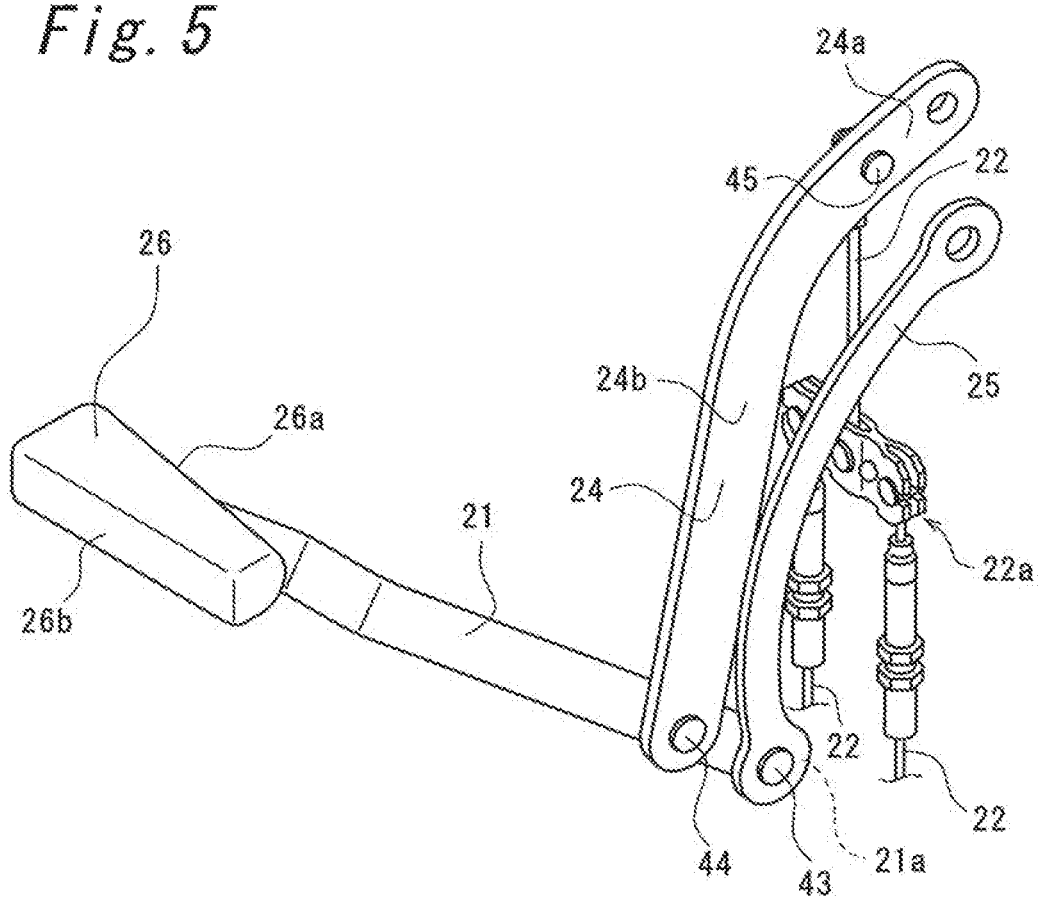
FIG. 5 is a perspective view of a handbrake device.

FIG. 5 is a perspective view of the handbrake device 20, in which the base plate 23 is omitted. As shown in FIG. 5, the brake lever 21 is turnably supported on the lower end of the second link 25 at a front end 21a via a third support pin 43, and is turnably supported on the lower end of the first link 24 via a fourth support pin 44 at a position away rearward from the front end 21a.

Further, one end of the brake wire 22 is connected to the first link upper portion 24a via a fifth support pin 45. The brake wire 22 is branched into two via an equalizer 22a, and the two branched brake wires 22 are each connected to the parking brake devices 14 (see FIG. 1) provided on the left and right rear wheels 4.

As described above, since the brake lever 21 is coupled to the base plate 23 by the first link 24 and the second link 25, the brake lever 21 is configured to be movable in a straight line substantially along the extending direction of the brake lever 21. Specifically, the brake lever 21 is movable in a direction inclined upward toward the rear between a first position where the grip 26 is located most forward (indicated by a solid line in FIG. 3) and a second position where the grip 26 is located on a rear upper side of the first position (indicated by a virtual line in FIG. 3).

When the grip 26 is moved from the first position to the second position, the first link lower portion 24b is pulled rearward via the brake lever 21, and the first link 24 turns rearward and upward around the first support pin 41, which causes the first link upper portion 24a to turn upward. As a result, the brake wire 22 connected to the first link upper portion 24a is pulled upward, and as a result, the parking brake is operated by the parking brake devices 14.

Conversely, when the grip 26 is moved from the second position to the first position, the first link upper portion 24a turns downward, which releases the upward pull of the brake wire 22, and as a result, the parking brake is released by the parking brake devices 14.

Therefore, the second position of the grip 26 is configured as a brake operating position for operating the parking brake, and the first position of the grip 26 is configured as a brake releasing position for releasing the parking brake.

As indicated by the virtual line in the side view shown in FIG. 3, in the second position of the grip 26, the front end 26a is located rearward of a front end 31b of the steering wheel 31, and the rear end 26b is located in front of a rear end 31c of the steering wheel 31. In other words, in the side view, in the second position, the grip 26 is located in the range in which the steering wheel 31 is projected downward.

Further, as indicated by the virtual line in the side view shown in FIG. 3, in the second position, the grip 26 is located above a seat cushion 6a of the driver seat 6L and below the steering wheel 31.

Furthermore, as indicated by the virtual line in the side view shown in FIG. 3, in the first position, the grip 26 is located in front of a rear end 36a of the grip 36 of the shift lever 32 located in the high-speed forward stage H or the low-speed forward stage L, and in the second position, the grip 26 is located behind the rear end 36a of the grip 36 of the shift lever 32 located in the high-speed forward stage H or the low-speed forward stage L.

In the plan view shown in FIG. 4, when moving from the first position to the second position, the grip 26 of the brake lever 21 moves in a direction inclined to the left toward the rear along the extending direction of the brake lever 21. Therefore, when the grip 26 is located in the second position indicated by the solid line, the grip 26 is located on the left side of the first position indicated by the virtual line.

Further, in the plan view shown in FIG. 4, in the second position, the left end 26c of the grip 26 is located on the left side of a right end 33a of the accelerator pedal 33, and further, at least a part of the grip 26 is located in a region R1 obtained by projecting the accelerator pedal 33 in the front-back direction. Furthermore, when the brake lever 21 is located in the second position, the left end 26c of the grip 26 is located on the right side of a right end 35a of the brake pedal 35. In other words, the grip 26 is away to the right side from a region R2 obtained by projecting the brake pedal 35 in the front-rear direction.

Further, when the grip 26 is located in the second position, the grip 26 is arranged so as to narrow, to the rear side, a grip rear region R4 defined on the rear side of the grip 26 in a start operation region R3 obtained by projecting the region R1 to the upper side of the vehicle body as compared to the position when the grip 26 is located in the first position. Further, the grip 26 is away to the right side from a braking operation region R5 obtained by projecting the region R2 to the upper side of the vehicle body in both the first position and the second position.

Figure 6:
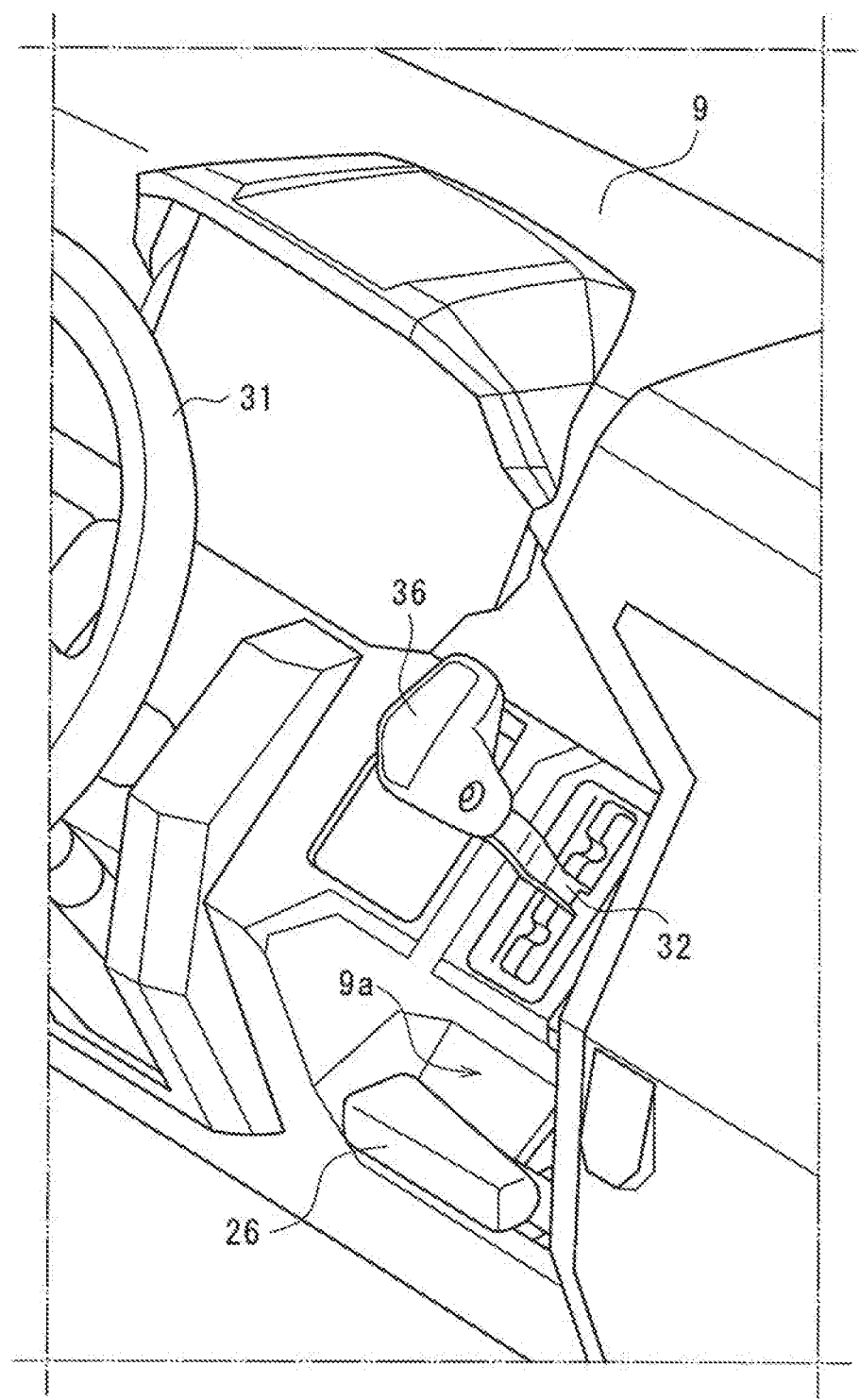
FIG. 6 is a perspective view of the periphery of a dash panel.

FIG. 6 is a perspective view of the periphery of the driver seat 6L in the riding space S as viewed from the rear. As shown in FIG. 6, the dashboard 9 has a recess 9a that is recessed forward on the front right side of the steering wheel 31 and below the shift lever 32. At least a part of the grip 26 is located in the recess 9a when the brake lever 21 is located in the first position.

As shown in FIG. 3, when the vehicle 1 is running, the grip 26 is located in the recess 9a of the dashboard 9 in the first position. At this time, the grip 26 is away frontward from the right foot of the driver (indicated by the alternate long and two short dashes line) operating the accelerator pedal 33 and the right foot of the driver (indicated by the alternate long and short dash line) operating the brake pedal 35.

Next, under a state where the driver depresses the brake pedal 35 with his right foot to operate the foot brake and stop the vehicle 1, the grip 26 of the brake lever 21 is moved from the first position to the second position to operate the parking brake. At this time, as shown in FIGS. 3 and 4, the grip 26 is located close to the right side of a right knee 51 of the driver who has depressed the brake pedal 35. Therefore, under a state in which the grip 26 is moved to the second position while the brake pedal 35 is depressed with the right foot 50R, the right foot 50R and the grip 26 do not interfere with each other.

In order to start the vehicle 1 from this state, it is necessary to return the grip 26 from the second position to the first position in order to release the parking brake. Here, if the driver tries to perform the start operation while forgetting to return the grip 26 to the first position and moves the right foot 50R from the brake pedal 35 to the accelerator pedal 33 located on the right side, since the grip 26 located in the second position is located close to the right side of the right knee 51 of the driver, the right knee 51 interferes with the grip 26. This makes it easier for the driver to recognize that he tries to perform the start operation while the parking brake is operated.

According to the vehicle 1 according to the embodiment described above, the following effects are obtained.

(1) When the start operation is performed in a state where the parking brake is operated (that is, the grip 26 is located in the second position), the grip 26 of the brake lever 21 is recognized, so that it is easier to notice that the parking brake is in the operating state. As a result, forgetting to return the grip 26 to the first position is suppressed in the running state.

(2) The second position is located behind the first position, and when the grip 26 is located in the second position, the left end 26c of the grip 26 is located on the left side of the right end 33a of the accelerator pedal 33. According to this configuration, when the right foot 50R depressing the brake pedal 35 is switched to depress the accelerator pedal 33 when the grip 26 is located in the second position, the grip 26 of the brake lever 21 easily interferes with the right foot 50R. This makes it easier to recognize that the parking brake is in the operation state.

(3) When the grip 26 is located in the second position, the left end 26c of the grip 26 is located on the right side of the right end 35a of the brake pedal 35. According to this configuration, the above-mentioned recognition that the parking brake is in the operating state when the right foot 50R depressing the brake pedal 35 is switched to depress the accelerator pedal 33 can be realized without affecting the operation of the parking brake.

(4) When the grip 26 is located in the second position, the front end 26a of the grip 26 is located behind the front end 31b of the steering wheel 31, and the rear end 26b of the grip 26 is located in front of the rear end 31c of the steering wheel 31. Generally, in the side view of the vehicle, the knee portion of the driver is located in the range in which the steering wheel is projected downward due to the relationship between the driver seat and the steering wheel. Therefore, as in this configuration, by arranging the grip 26 within the range in which the steering wheel 31 is projected downward in the side view of the vehicle, in the second position, when the driver switches the right foot 50R depressing the brake pedal 35 to depress the accelerator pedal 33 to perform the start operation, the grip 26 easily interferes with the right knee 51 of the driver.

(5) The grip 26 is located between the seat cushion 6a and the steering wheel 31 in the up-down direction in the second position. According to this configuration, the grip 26 is easily located at the height of the right knee 51 of the driver located between the seat cushion 6a and the steering wheel 31 in the second position. Therefore, when the driver switches from depressing the brake pedal 35 to depressing the accelerator pedal 33 to perform the start operation, the grip 26 easily interferes with the right knee of the driver.

(6) In the handbrake device 20, since the brake wire 22 is connected to the first link 24, the brake wire does not slide against a tubular component as compared to the structure in which a brake wire is placed inside the tubular component which is a general structure in a handbrake device that moves a grip linearly. Therefore, while the handbrake device 20 is configured to move the grip 26 linearly, it is easier to suppress wear due to sliding of the brake wire 22.

(7) In the vehicle width direction, the grip in the second position is located on a left side of the grip in the first position. According to this configuration, when the grip 26 is moved from the first position to the second position, the grip 26 is pulled out to the left side so as to approach the driver toward the rear. As a result, when the grip 26 is located in the first position, the grip 26 is away from various control operators such as the steering wheel 31 and the shift lever 32, and hence is easily accessible. On the other hand, when the grip 26 is located in the second position, it is easier to recognize that the grip 26 is located in the second position by operating the various control operators.

(8) When the grip 26 is located in the first position, at least a part of the grip 26 is located in the recess 9a of the dashboard 9. According to this configuration, when the grip 26 is located in the first position, that is, when the parking brake is released, the grip 26 does not get in the way and the riding space S can be widely secured.

(9) When the grip 26 is located in the second position, the grip 26 is located above and behind the position when the grip 26 is located in the first position. According to this configuration, when the grip 26 is located in the second position, it is easier to position the grip 26 in the vicinity of the right knee 51 of the driver, and the driver easily recognizes that the grip 26 is located in the second position at the time of the start operation.

(10) The rear end 26b of the grip 26 is located in front of the rear end 36a of the grip 36 of the shift lever 32 in the first position, and the rear end 26b of the grip 26 is located behind the rear end 36a of the grip 36 of the shift lever 32 in the second position. According to this configuration, when the grip 26 of the brake lever 21 is located in the second position, it is easier to position the grip 26 in the vicinity of the right knee 51 of the driver, and the driver easily recognizes that the grip 26 is located in the second position at the time of the start operation.

(11) In the plan view, at least a part of the grip 26 located in the second position is located in the region R1 obtained by projecting the accelerator pedal 33 in the front-back direction. According to this configuration, when the right foot 50R depressing the brake pedal 35 is switched to depress the accelerator pedal 33 on the right side in a state where the grip 26 is located in the second position, the grip 26 easily interferes with the right foot 50R. This makes it easier to recognize that the parking brake is in the operation state.

(12) The steering wheel 31 is arranged on one side in the vehicle width direction, that is, on the left side in the present embodiment, and the handbrake device 20 is arranged on the other side in the vehicle width direction with respect to the steering wheel 31, that is, on the right side in the present embodiment. According to this configuration, even when the grip 26 is located in the second position, the grip 26 does not get in the way when the driver gets into the driver seat 6L, and deterioration of the boarding property to the vehicle is prevented.

(13) The front end 26a of the grip 26 extends in a direction inclined to the rear toward the right so as to be orthogonal to the extending direction of the brake lever 21, whereas the rear end 26b of the grip 26 extends parallel to the vehicle width direction. According to this configuration, when the grip 26 is moved from the first position to the second position in a direction inclined to the left toward the rear, the front end 26a of the grip 26 on which the pulling force by the driver acts extends so as to be orthogonal to the moving direction of the grip 26. This makes it easier to apply force to the grip 26 and pull it to the second position. Meanwhile, since the rear end 26b extends parallel to the vehicle width direction, the grip 26 extends substantially parallel to the outer surface of the dashboard 9 when viewed from the driver, and the deterioration of the appearance is suppressed.

(14) When the grip 26 is located in the second position, the grip 26 is arranged so as to narrow the grip rear region R4 defined on the rear side of the grip 26 in the start operation region R3 obtained by projecting the region R1, which is obtained by projecting the start operators such as the accelerator pedal 33 and the shift lever 32 in the front-rear direction, to the upper side of vehicle body as compared to the position when the grip 26 is located in the first position. According to this configuration, since, when the grip 26 is located in the second position, the grip rear region R4 is narrowed to the rear side. As a result, when the driver operates the start operators such as the accelerator pedal 33 and the shift lever 32, the driver easily recognizes that the grip 26 is located in the second position.

(15) Regardless of whether the grip 26 is located in the first position or the second position, the grip 26 is arranged at a position away from the braking operation region R5 obtained by projecting the region R2, which is obtained by projecting the brake pedal 35 (braking operator) in the front-rear direction, to the upper side of vehicle body. According to this configuration, the operation of the brake pedal 35 is not hindered by the grip 26 regardless of whether the grip 26 is located in the first position or the second position.

In the above embodiment, the grip 26 is configured to interfere with the knee 51 of the right foot 50R that is switched from depressing the brake pedal 35 to depressing the accelerator pedal 33 when the grip 26 is moved to the second position, but the configuration may be such that it is recognized that the grip 26 is located in the second position at the time of other start operation using the steering wheel 31, the shift lever 32, and the like.

Figure 7:
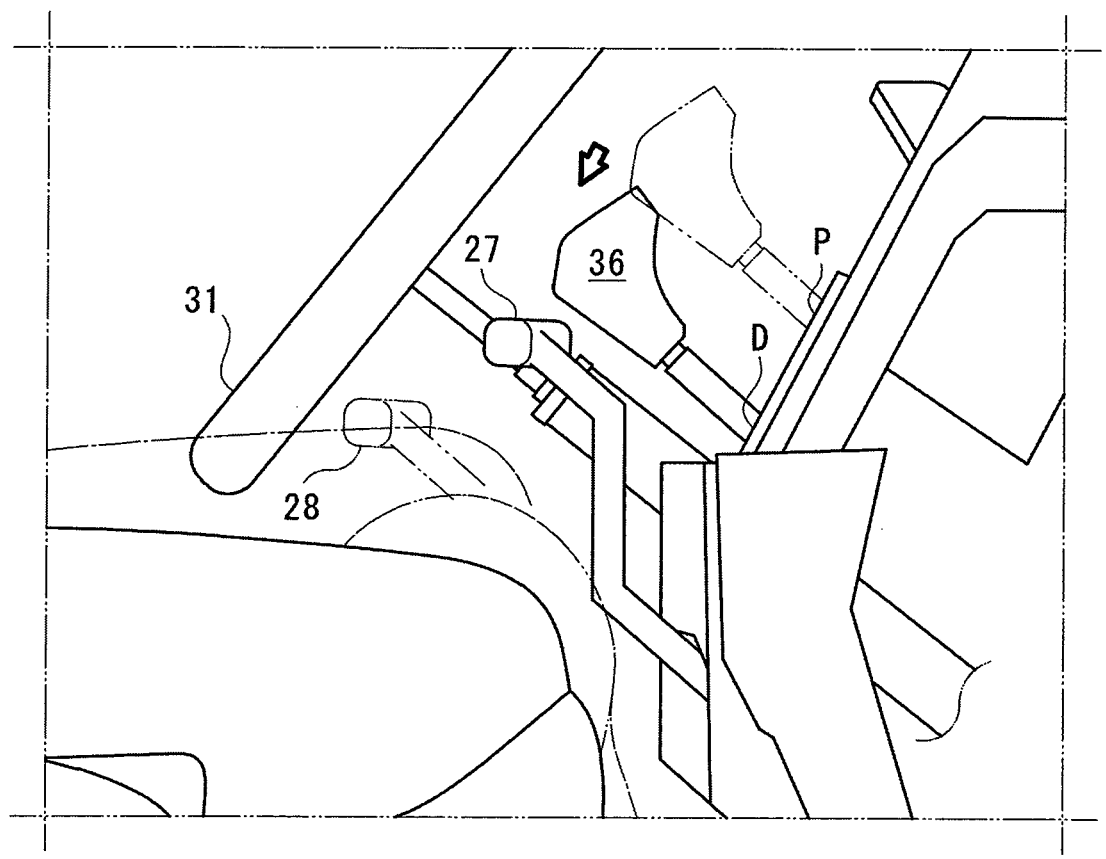
FIG. 7 is a side view showing the periphery of a grip located in a second position according to a modified example.

For example, as shown in FIG. 7, in the case of the configuration that the shift positions of the shift lever 32 include the forward speed stage D on the lowermost side and the parking position P above the forward speed stage D, in the second position, a grip 27 may be configured to be brought close to the steering wheel 31 or the grip 36 of the shift lever 32 located in the forward speed position D. For example, it is preferable that the grip 27 be brought close to the grip 36 of the shift lever 32 with a gap of about 10 mm or less, in the second position. More preferably, it is more preferable that the grip 27 be brought close to the grip 36 of the shift lever 32 with a gap of about 5 mm or less, in the second position. Further, as indicated by the virtual line in FIG. 7, a grip 28 may be brought close to the steering wheel 31 in the second position. This may cause the grips 27 and 28 to interfere with the right hand of the driver operating the shift lever 32 or steering wheel 31 in the second position.

Figure 8:
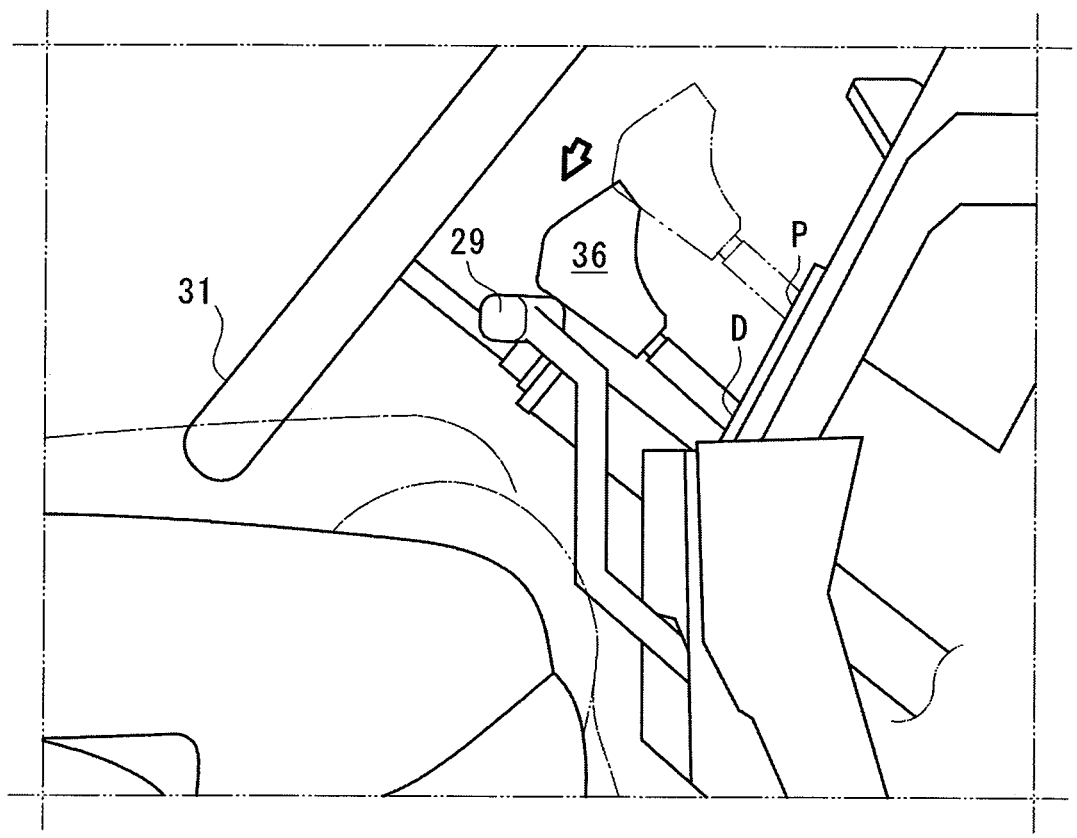
FIG. 8 is a side view showing the periphery of the grip located in the second position according to a further modified example.

Further, as shown in FIG. 8, a grip 29 may interfere with the grip 36 of the shift lever 32 located in the forward speed position D, in the second position.

Further, in the above embodiment, the case where the brake wire 22 is connected to the first link 24 has been described as an example, but the brake wire 22 may be connected to the second link 25 instead.

Further, in the above embodiment, the handbrake device 20 of rope type using the brake wire 22 has been described as an example, but the present invention is not limited to this. The handbrake device 20 may be such that the grip 26 is configured to be movable between the first position and the second position, and can be applied to, for example, an electric parking brake operating device that does not include the brake wire 22.

Various modifications and changes may also be made without departing from the spirit and scope of the invention described in the claims.

What is claimed is:

1. A vehicle comprising:
   a brake pedal configured to be able to operate a foot brake device;
   an accelerator pedal located on a right side of the brake pedal;
   a shift lever;
   a steering wheel; and
   a handbrake device which includes a brake lever extending in a front-rear direction and a grip provided at a rear end of the brake lever, and is configured to be able to manually operate and release a parking brake by a parking brake device, wherein
   the handbrake device supports the brake lever so that the grip is movable between a first position at which the parking brake is released and a second position at which the parking brake is operated,
   the second position is set to a position at which the grip is recognized upon a start operation for moving the vehicle with any one of the accelerator pedal, the shift lever, and the steering wheel,
   the second position is located behind the first position, and
   when the grip is located in the second position, in a vehicle width direction, a left end of the grip is located on a left side of a right end of the accelerator pedal.

2. The vehicle according to claim 1, wherein, when the grip is located in the second position, in the vehicle width direction, the left end of the grip is located on a right side of a right end of the brake pedal.

3. The vehicle according to claim 1, wherein, when the grip is located in the second position, a front end of the grip is located behind a front end of the steering wheel, and a rear end of the grip is located in front of a rear end of the steering wheel.

4. The vehicle according to claim 1, further comprising a driver seat, wherein
   the driver seat includes a seat cushion extending in the front-rear direction, and
   when the grip is located in the second position, the grip is located above the seat cushion and below the steering wheel.

5. The vehicle according to claim 1, wherein
   the handbrake device includes:
   a base plate fixed to a body frame;
   a first link that extends in an up-down direction and has an upper end turnably supported by the base plate; and a second link that extends in the up-down direction on a front side of the first link and has an upper end turnably supported by the base plate, a brake wire connected to the parking brake is connected to either the first link or the second link, the brake lever is turnably coupled to a lower end of each of the first link and the second link at a front end, and when the grip moves from the first position to the second position, the grip moves linearly in the front-rear direction along an extending direction of the brake lever.

6. The vehicle according to claim 1, wherein, in the vehicle width direction, the grip in the second position is located on a left side of the grip in the first position.

7. The vehicle according to claim 1, further comprising a dashboard, wherein the dashboard has a recess that is recessed forward, and when the grip is located in the first position, at least a part of the grip is located in the recess.

8. The vehicle according to claim 1, wherein, when the grip is located in the second position, the grip is located above and behind a position when the grip is located in the first position.

9. The vehicle according to claim 1, wherein when the grip is located in the first position, a rear end of the grip is located in front of a rear end of the shift lever, and when the grip is located in the second position, the rear end of the grip is located behind the rear end of the shift lever.

10. The vehicle according to claim 1, wherein, in a plan view, at least a part of the grip located in the second position is located in a region obtained by projecting the accelerator pedal in the front-back direction.

11. The vehicle according to claim 1, wherein the steering wheel is arranged on one side in a vehicle width direction, and the handbrake device is arranged on the other side in the vehicle width direction with respect to the steering wheel.

12. The vehicle according to claim 1, further comprising:

a driver seat; and a start operator located in front of the driver seat;

wherein the grip is located in front of the driver seat, and when the grip is located in the second position, the grip is arranged so as to narrow, to a rear side, a grip rear region defined on a rear side of the grip in a start operation region obtained by projecting a region, which is obtained by projecting the start operator in the front-rear direction, to an upper side of a vehicle body as compared to a position when the grip is located in the first position.

13. The vehicle according to claim 12, further comprising a braking operator located in front of the driver seat and adjacent to the start operator in a vehicle width direction, wherein regardless of whether the grip is located in the first position or the second position, the grip is arranged at a position away from a braking operation region obtained by projecting a region, which is obtained by projecting the braking operator in the front-rear direction, to an upper side of the vehicle body.

14. The vehicle according to claim 1, wherein the second position is a position at which the grip interferes with performance of the start operation with any one of the accelerator pedal, the shift lever, and the steering wheel.

15. A vehicle comprising:

a brake pedal configured to be able to operate braking by a foot brake;

an accelerator pedal located on a right side of the brake pedal;

a shift lever;

a steering wheel; and a handbrake device which includes a brake lever extending in a front-rear direction and a grip provided at a rear end of the brake lever, and is configured to be able to manually operate and release a parking brake by a parking brake device, wherein the handbrake device supports the brake lever so that the grip is movable between a first position at which the parking brake is released and a second position at which the parking brake is operated, the second position is set to a position at which the grip interferes with any one of the accelerator pedal, the shift lever, and the steering wheel which are subjected to a start operation the second position is located behind the first position, and when the grip is located in the second position, in a vehicle width direction, a left end of the grip is located on a left side of a right end of the accelerator pedal.

16. A vehicle comprising:

a brake pedal configured to be able to operate a foot brake device;

an accelerator pedal located on a right side of the brake pedal;

a shift lever; and a handbrake device which includes a brake lever extending in a front-rear direction and a grip provided at a rear end of the brake lever, and is configured to be able to manually operate and release a parking brake by a parking brake device, wherein the handbrake device supports the brake lever so that the grip is movable between a first position at which the parking brake is released and a second position at which the parking brake is operated, the second position is set to a position at which the grip is recognized upon a start operation for moving the vehicle with any one of the accelerator pedal and the shift lever the second position is located behind the first position, and when the grip is located in the second position, in a vehicle width direction, a left end of the grip is located on a left side of a right end of the accelerator pedal.

17. The vehicle according to claim 16, wherein the second position is a position at which the grip interferes with performance of the start operation with any one of the accelerator pedal and the shift lever.

* * * * *